United States Patent [19]

Yoshioka

[11] Patent Number: 4,560,276
[45] Date of Patent: Dec. 24, 1985

[54] DIFFRACTION GRATING MOUNTING DEVICE FOR SCANNING MONOCHROMATOR

[75] Inventor: Shigeyoshi Yoshioka, Tokyo, Japan
[73] Assignee: Atago Bussan Co. Ltd., Tokyo, Japan
[21] Appl. No.: 525,414
[22] Filed: Aug. 22, 1983
[30] Foreign Application Priority Data Sep. 2, 1982 [JP] Japan .................. 57-132356[U]

[51] Int. Cl.⁴ ........................ G01J 3/06; G01J 3/18
[52] U.S. Cl. ........................................... 356/334
[58] Field of Search ............... 356/308, 309, 328, 332, 356/333, 334

[56] References Cited

U.S. PATENT DOCUMENTS 2,948,185 8/1960 Ward et al. .................. 356/334 X
3,418,051 12/1968 Staunton ...................... 356/334 X

*Primary Examiner*—F. L. Evans
*Attorney, Agent, or Firm*—Spencer & Frank

[57] ABSTRACT

A diffraction grating mounting device for a scanning monochromator comprising: a base member; a diffraction grating; a diffraction grating supporting axle which integrally supports the diffraction grating and is rotatably supported by the base member; a first arm fixed to the diffraction grating supporting axle at right angles thereto; a second arm which is swingably supported on the base member in uniplanar relation with the first arm; a link member which connects the first and the second arms at points equally apart from the rotational centers of the first and second arms, respectively, the distance between the points being equal to that between the rotational centers of the first and second arms; a cam follower axle fixed to the link member at right angles thereto; a cam having a linear driving portion and being provided at one end of a right circular cylinder; a motor for driving the cam; and means for biasing the link member of the first and second arms so as to make the cam follower axle contact the cam.

5 Claims, 2 Drawing Figures

DIFFRACTION GRATING MOUNTING DEVICE FOR SCANNING MONOCHROMATOR

BACKGROUND OF THE INVENTION

The present invention relates to a mounting device for a diffraction grating used for a rapid scanning monochromator, and more particularly to a mounting device for a diffraction grating in which the scanning velocity is equal over the entire wavelength of the monochromator.

In the study of various spectra, the importance of rapid spectra measuring over a certain wavelength region has recently been noted, and a new method has been proposed in place of the conventional photographic spectra measuring. In the new proposal, a semiconductor light detecting element which is a multichannel detector is placed at an exit focal plane and the wavelength scanning is carried out according to a completely electrical method. However, the proposed new method is applicable only to monochromators and spectrographs which have a flat field of focus. Also, it uses expensive elements as for example in the scanning circuits. The sensitivity of the light receiving element itself and spectroscopic sensitivity characteristic are limited to a certain extent.

On the other hand, a photomultiplier has high sensitivity, is not expensive and can provide various spectroscopic sensitivity characteristics. Therefore it is suitable for use as a light detecting element for the rapid scanning monochromator.

Such a rapid scanning monochromator provided with an oscillating folding mirror placed in the very front of an exit slit is known, in which the light path is changed by the oscillation of the mirror and light in a certain wavelength region is passed through the slit repeatedly to measure the spectra. According to this method, however, by the change of angle of the oscillating mirror the opening angle of a light collecting mirror placed at the exit side changes and as a result, the spectral intensity is not constant. Also, a linear relation does not exist between the rotational angle of the oscillating mirror and the irradiated wavelength, thus requiring further complicated and very expensive electrical converters for correctly indicating and recording the spectra.

A further monochromator of the photomultiplier type which uses a combination of a cam and a bar attached to a grating axle or a combination of a screw and a sine bar is known. In the former, a bar or an arm mounted on the rotating axle of the diffraction grating is driven by a cam. In the latter case, a sine bar coaxially fixed to the diffraction grating is attached to a roller mounted around a screw. By the rotation of the screw, the roller moves, and therefore linear wavelength scanning is carried out with respect to the rotational angle of the driving axle of the screw. In the former case, the cam is continuously rotated with certain velocity and thereby the diffraction grating is oscillated so that a rapid scanning is carried out. In this method, the above-mentioned problem of the change of the opening angle of the light collecting mirror and the linearity of the wavelength may be solved, but it is difficult to manufacture a cam of the wavelength linear type. Also it is not possible to obtain linear scanning over certain wavelength region of the monochromator with the same cam. In the latter method using a sine bar and a screw, the screw repeats a reciprocating rotation and therefore it may not be used for a ultra-high speed reciprocating movement.

SUMMARY OF THE INVENTION

A diffraction grating mounting device for a scanning monochromator according to the present invention comprises: a base member; a diffraction grating; a diffraction grating supporting axle which integrally supports the diffraction grating and is rotatably supported by the base member; a first cam fixed to the diffraction grating supporting axle at right angles thereto; a second arm which is swingably supported on the base member in a unipolar relation with the first arm; a link member which connects the first and the second arms at points equally apart from the rotational centers of the first and second arms, respectively, the distance between the points being equal to that between the rotational centers of the first and second arms; a cam follower axle fixed to the link member at right angles thereto; a cam having a linear driving portion and being provided at one end of a right circular cylinder; a motor for driving the cam; and means for biasing the link member of the first and second arms so as to make the cam follower axle contact with the cam.

DETAILED DESCRIPTION OF PREFERRED EMBODIMENT

Figure 1:
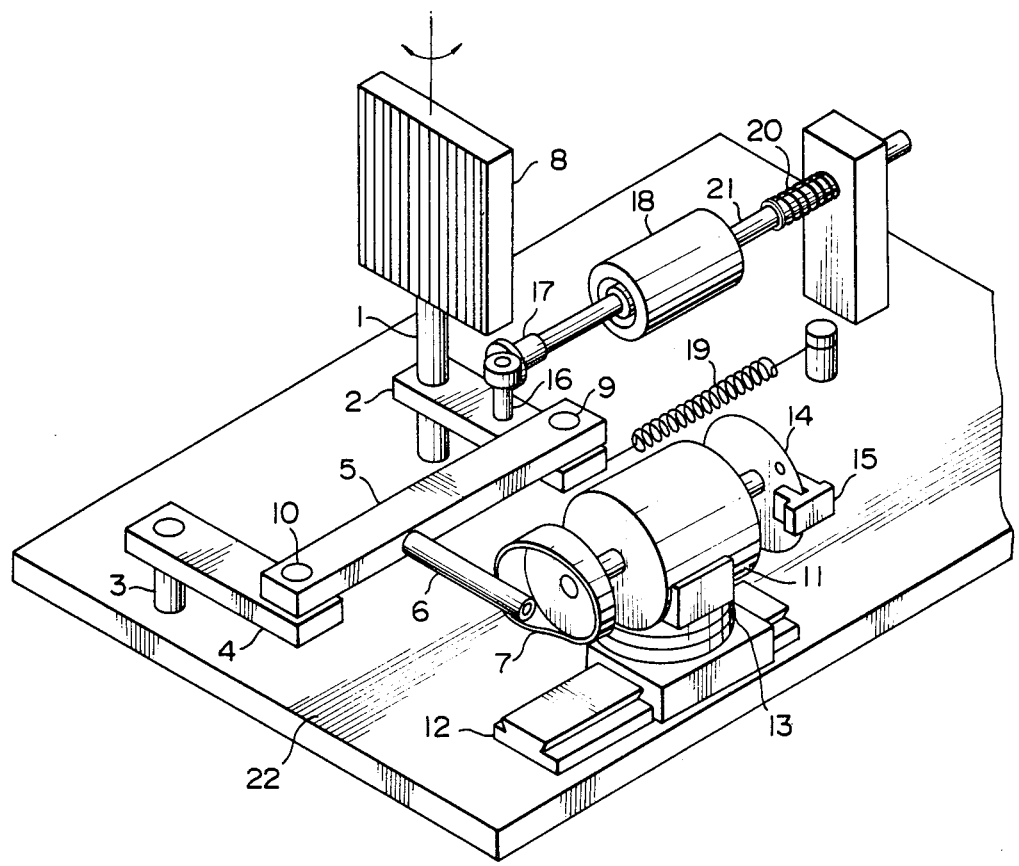
FIG. 1 is a perspective view of an embodiment of the diffraction grating mounting device according to the present invention.

In FIG. 1, which shows a perspective view of an embodiment of the mounting device of the diffraction grating for a rapid scanning monochromator, an axle 1 is rotatably supported on a base plate 22, and a diffraction grating 8 is integrally fixed to the axle 1. To the axle 1 is fixed an arm 2, which rotates with the diffraction grating 8.

The diffraction grating used may be one applicable to any type of monochromators, such as the Czerny-Turner type, Ebert type, Littrow type, normal incidence type or grazing incidence type.

Similar to the diffraction grating rotating axle 1, a rotating axle 3 is rotatably mounted on the base plate 22, and to the axle 3 an arm 4 is fixed. Connecting pins 9 and 10 protrude from arms 2 and 4 respectively, the centers of the respective pins 9 and 10 being the same distance apart as the rotational centers of the respective arms. On the pins 9 and 10 a link member 5 is mounted, so that the arms 2 and 4 may be rotated simultaneously and at the same angle. The distance between the pins 9 and 10 on the link member 5 is equal to that between the centers of the axles 1 and 3. When the centers of the axles 1 and 3 and those of the connecting pins 9 and 10 are on the center lines of the arms and the link member 5, the mutual relation of the two arms 1 and 3 and the link member 5 is set as follows: When a monochromator having the diffraction grating 8 as the dispersing element emits zero-order light, the three members form three edges of a rectangle or a square. In other cases, the three members are set to form the three edges of a parallelogram. At right angles with the center line of the link member 5, there is mounted thereto a cam follower axle or driven pin 6, in parallel with the movement plane of the link mechanism formed by the three members. The outer surface of the pin 6 rotates as a roller, to which a cam 7 is attached and with which it rotates. By the biasing force of a spring 19 the pin 6 always presses on the cam 7. The displacement of the pin 6 by the cam 7 is transmitted through the above-mentioned link mechanism to the diffraction grating rotating axle 1, thereby providing a reciprocating maintains to the grating 8.

Now assume that the arm 2 rotates through an angle $\theta$ from the position where the monochromator emits the zero-order light, the exit wavelength $\theta$ will be given by the equation:

$$\lambda = A \cdot \mathrm{SIN}\ \theta,$$

wherein A is a constant of the device. The driven pin 6 is placed always at right angles with respect to a base line connecting the centers of the axle 1 and the axle 3 and its displacement from the time of the zero-order emission in the parallel direction with respect to the base line is given by SIN $\theta$, or in other words in proportion to the irradiated wavelength of the monochromator. Therefore, the cam 7 is formed so as to give in the displacement line thereof a linear main moving area except the returning portion to the start position, which is clearly shown in FIG. 2. By rotating the cam 7 at a constant speed to drive the pin 6, repetitive scanning of a certain width of the wavelength may be possible at a certain wavelength changing velocity.

Figure 2:
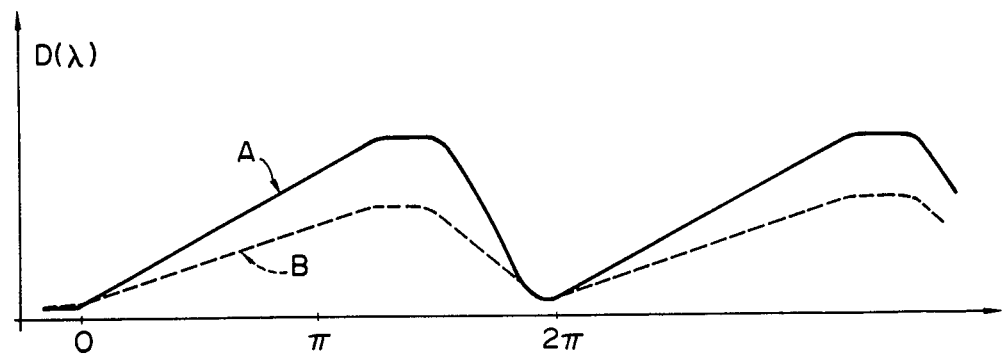
FIG. 2 are a characteristic curves of a cam used in the embodiment of the device, which causes shows displacement as a function of the rotational angle of the cam.

The cam 7 is connected directly with a motor 11 and both members may be moved as a whole along a guide line extending in a direction parallel to the base line. Thus, the center angle of oscillation of the diffraction grating 8 may be set freely to the desired wavelength position of the monochromator. The cam 7 and the motor 11 as a whole may also be rotated on a rotating disc 13 and fixed to a desired position, so as to change the angle between the cam shaft and the driven pin 6. According to the shown relation, if the angle formed between the cam axis and the pin 6 is (90°−γ) degrees, the effective displacement value of the cam 7 to the pin 6 is given by multiplying the displacement value at the angles of 90 degrees by COS γ. In FIG. 2, the displacement of the cam, when the angle between the cam axis and the pin is changed by γ degrees, is given by B. If the angle of the cam axis is fixed, the value of COS γ becomes a constant value, thus enabling an increase or decrease in the extent of displacement given to the pin 6 while keeping the uniformity of the cam movement regardless of the position of the cam and the motor on the guide 12. The width of the wavelength region to be scanned may thus be set as desired. At one end of the cam shaft there is provided a rotational angle detection device comprising a small disc 14 with a small opening and a photoswitch 15. With this detector, the time of start of each scanning may be known, and such information is used in applying a start trigger signal to the oscilloscope for indication of the spectra or data memory for recording the spectra. In place of the above mentioned combination, other detecting devices such as the combination of a Hall element and a magnet or a pin and a microswitch may be used. A driving pin 16 provided with a roller is mounted on the arm 2, and a driven flat plate 17 is pressed into contact with the roller by a spring 20. The movement of the flat plate 17 is transmitted to a differential transformer 18 through a rod 21. In this connection, the transformer 18 is placed in parallel with the above-mentioned base line and is already set to provide a zero output when the monochromator emits zero-order light. An electrical output is obtained from the differential transformer 18 in proportion to the emitted wavelength of the monochromator. The output provides a real time indication of the value of the wavelength for an X-axis input of an oscilloscope for the indication of spectra, or for an address input to a data memory for the recording of the spectra. In place of the above-mentioned differential transformer, other position detectors may be used, such as a linear potentiometer, linear encoder, etc. which have linear output characteristic.

As fully described above, the diffraction grating mounting device according to the present invention comprises a link mechanism including arms, a driven pin and a linearly displacing rotational cam. Since these members do not include any sliding portions, a smooth and rapid movement is obtained, and the device is easily manufactured. Particularly, the linear displacement type rotational cam may be manufactured with much precision without complicated design calculations and at low cost. According to the present invention, the wavelength scanning is linear with respect to time for any set scanning wavelength width over the entire wavelength region of the monochromator. Therefore, the monochromator according to the present invention may be used with any type of data memory devices.

What is claimed is:

1. In a diffraction grating mounting device for a scanning monochromator comprising:
    (a) a base member;
    (b) a diffraction grating;
    (c) a diffraction grating supporting axle which integrally supports the diffraction grating and is rotatably supported by the base member;
    (d) a first arm fixed to the diffraction grating supporting axle at right angles thereto;
    (e) a second arm swingably supported on the base member in a uniplanar relation with the first arm;
    (f) a link member connecting the first and the second arms at points equidistant from the rotational centers of the first and second arms, respectively, the distance between the points being equal to that between the rotational centers of the first and second arms;
    (g) a cam follower axle fixed to the link member;
    (h) a cam;
    (i) a motor for driving the cam; and
    (j) means for biasing the link member of the first and second arms so as to make the cam follower axle contact said cam;
    the diffraction grating mounting device wherein said cam follower axle is fixed to said link member at right angles thereto and is located in a plane parallel to the plane formed by said first and second arms, said cam has a linear driving portion, and the rotational position of said cam is adjustable in a direction parallel to a line connecting the points at which said link member is connected to said first and second arms.

2. A diffraction grating mounting device for a scanning monochromator according to claim 1, wherein the direction of the rotational center axis of the cam is adjustable in a plane at right angles to the diffraction grating supporting axle.

3. A diffraction grating mounting device for a scanning monochromator according to claim 1, which further includes an encoding disc, said encoding disc being rotatable integrally with said cam.

4. A diffraction granting mounting device for a scanning monochromator according to claim 1, wherein the swinging movement of the first arm is read out by a linear encoder.

5. A diffraction grating mounting device for a scanning monochromator according to claim 1, wherein the cam is provided at one end of a right circular cylinder.

* * * * *